United States Patent [19]

Bokerman et al.

[11] 4,133,939
[45] Jan. 9, 1979

[54] METHOD FOR APPLYING A SILICONE RELEASE COATING AND COATED ARTICLE THEREFROM

[75] Inventors: Gary N. Bokerman, Midland; David J. Gordon, Essexville, both of Mich.

[73] Assignee: Dow Corning Corporation, Midland, Mich.

[21] Appl. No.: 861,134

[22] Filed: Dec. 16, 1977

[51] Int. Cl.$^2$ .................. B32B 21/04; B05D 3/06
[52] U.S. Cl. ..................... 428/447; 204/159.13; 260/827; 427/44; 427/54; 428/452; 428/537
[58] Field of Search .................. 428/447, 452, 537; 427/44, 36, 54; 204/159.13; 260/827

[56] References Cited

U.S. PATENT DOCUMENTS

| | | | |
|---|---|---|---|
| 3,346,405 | 10/1967 | Viventi | 106/14 |
| 3,535,145 | 10/1970 | Gowdy | 428/447 |
| 3,726,710 | 4/1973 | Berger et al. | 204/159.13 X |
| 3,873,499 | 3/1975 | Michael et al. | 260/46.5 E |
| 4,029,827 | 6/1977 | Imperial et al. | 427/22 |
| 4,035,453 | 7/1977 | Hittmair et al. | 260/827 X |
| 4,045,390 | 8/1977 | Itoh et al. | 260/37 SB X |
| 4,052,529 | 10/1977 | Bokerman et al. | 428/537 |

FOREIGN PATENT DOCUMENTS

| | | | |
|---|---|---|---|
| 653301 | 12/1962 | Canada | 204/159.13 |
| 1409223 | 10/1975 | United Kingdom | 204/159.13 |

*Primary Examiner*—Michael F. Esposito
*Assistant Examiner*—Thurman K. Page
*Attorney, Agent, or Firm*—George A. Grindahl

[57] ABSTRACT

Solid substrates are provided with a cured silicone release coating by applying certain mercaptoalkyl-containing triorganosiloxane-endblocked polydiorganosiloxane fluids to the surface of the substrate and exposing the applied fluid to energetic radiation to rapidly cure and bond the fluid. For example, a mixture of benzophenone and a trimethylsiloxane-endblocked copolymer of dimethylsiloxane units and methylmercaptopropylsiloxane units, when applied to kraft paper and cured with ultraviolet light, provides premium release of aggressive acrylic adhesive from the surface of the coated paper.

7 Claims, No Drawings

METHOD FOR APPLYING A SILICONE RELEASE COATING AND COATED ARTICLE THEREFROM

BACKGROUND OF THE INVENTION

This invention relates to a method for coating and rapidly curing a mercaptoalkyl-containing polydiorganosiloxane on a solid substrate. In one aspect this invention relates to a method of coating cellulosic paper with a silicone release coating to provide premium release of adhesive materials therefrom.

In the pressure sensitive adhesive art it is often desirable to prepare an adhesive-bearing article such as a label or a tape and to store the article for some time before use. In the storage process the adhesive-bearing article is conveniently adhered to an intermediate surface from which it must be removed before use. For example, said tape is wound in a coil whereby the adhesive surface of one turn of the tape is adhered to the non-adhesive surface of the previous turn of the tape. Preferential release of the upper turn of tape with its adhesive from the previous turn is needed to unwind and use the tape. In another example, adhesive-bearing labels are frequently supplied with a protective paper over the adhesive, which paper must be easily removable from the adhesive before the label is applied in its intended use.

Polyorganosiloxanes have been used for a long time to coat solid substrates, such as paper, to improve the release of adhesive materials therefrom. As the adhesive properties and holding power of adhesive materials have improved, the need for improved release coatings has increased. Improved release coatings have also been required by other factors such as increasing environmental concerns, a desire for faster coating and curing processes, and a need to lower process energy costs.

Solventless, radiation-curable coatings have thus been sought that would provide improved release and preferably premium release of adhesives, particularly aggressive acrylic adhesives. A coating is considered to provide premium release if a force of not more than 100 grams per inch (38.61 newtons per meter), as measured by the method hereinafter described, is needed to remove the adhesive from the coating. Of course, the release force should not be so low as to allow the adhesive to fall off or to be accidentally displaced from the surface of the substrate. A release force of at least 20 grams per inch is usually sufficient for this purpose. An aggressive adhesive is a material that requires a force of at least approximately 460 newtons/meter (N/m) to remove the adhesive from a stainless steel mirror surface using said method of measuring.

Radiation-curable coatings comprising mercaptoalkylsubstituted organopolysiloxanes are taught by Berger, et al., U.S. Pat. No. 3,726,710; Michael, et al., U.S. Pat. No. 3,873,499; Gant, British Pat. No. 1,409,223 and Bokerman, et al., U.S. Pat. No. 4,052,529. However, these disclosures teach that an organosilicon compound containing vinylic unsaturation is needed to cure the mercaptoalkyl-substituted organopolysiloxane. The resulting compositions are thus multi-component compositions and are considered less desirable, from cost, preparative and stability viewpoints, than one-component compositions.

Radiation curing of organopolysiloxanes, including ultraviolet light curing of organopolysiloxanes containing functional organic groups such as organic groups containing hydroxyl, amino, carboxyl, ester, carbamyl, nitrile, amide, hydrosulfide, sulfate, nitro and sulfide substituents has also been discussed by Warrick in Canadian Pat. No. 653,301. However, Warrick's broad disclosure relating to organopolysiloxane structure and reciting long cure times, ranging from a few minutes to several hours, offers no solution for the problem of coating a substrate with a one-component, radiation-curable coating composition that will cure in seconds and will provide premium release of adhesives.

One-component mercaptoalkyl-containing organopolysiloxane compositions have been applied to vinylic polymers by Gowdy, et al., U.S. Pat. No. 3,535,145; to copper and silver by Viventi, U.S. Pat. No. 3,346,405 and to fuser elements in electrostatic copiers by Imperial, et al. U.S. Pat. No. 4,029,827. The disclosures of Viventi and Imperial, et al. relate to applying a mercaptoalkyl-containing organopolysiloxane to a substrate whereupon a reaction of some sort, other than curing, occurs between the substrate and the applied mercaptoalkyl-containing organopolysiloxane. However these disclosures do not relate to curing one-component coatings to provide release of adhesives. Gowdy, et al. further apply heat or actinic radiation to the surface of the vinylic polymer to initiate a reaction that irreversibly bonds the applied organopolysiloxane thereto. However, Gowdy, et al. fail to provide a method for curing a mercaptoalkyl-containing polydiorganosiloxane on a solid substrate, such as paper, in seconds to provide premium release of aggressive adhesives.

SUMMARY OF THE INVENTION

It is an object of this invention to provide a method for coating a solid substrate with a rapid-curing, one-component, mercaptoalkyl-containing polydiorganosiloxane composition.

It is another object of this invention to provide a method of treating a substrate to provide premium release of aggressive adhesives therefrom.

It is a further object of this invention to provide an article comprising a solid substrate having adhered thereto a cured polyorganosiloxane coating which provides premium release of aggressive adhesives applied thereto.

These and other objects, which will be obvious to one skilled in the art after considering the following disclosure and appended claims, are achieved by applying to a solid substrate a radiation-curable polydiorganosiloxane composition consisting essentially of certain triorganosiloxane-endblocked polydiorganosiloxane fluids having silicon-bonded mercaptoalkyl radicals and exposing the applied composition to energetic radiation. In contrast to the teachings of the prior art a vinyl-containing component is not needed as a curing agent for said polydiorganosiloxane fluid to provide for rapid cure.

DESCRIPTION OF THE INVENTION

This invention relates to a method for treating a solid substrate to improve the release of adhesive materials therefrom, said method comprising (I) applying to the substrate a radiation-curable polydiorganosiloxane composition consisting essentially of a triorganosiloxane-endblocked polydiorganosiloxane fluid having a viscosity of at least 0.5 pascal-seconds at 25° C., wherein from 50 to 99 percent of all organic radicals are methyl, from 1 to 5 percent of all organic radicals are mercaptoalkyl having the formula $-(CH_2)_nSH$, wherein n has a value of from 1 to 4 inclusive, there being at least an average of 3 mercaptoalkyl radicals per molecule, any remaining organic radicals being phenyl radicals or alkyl radicals having from 2 to 6, inclusive, carbon atoms, (II) exposing the applied composition to energetic radiation, thereby curing the applied composition, and (III) recovering an article comprising the substrate having adhered thereto a cured polydiorganosiloxane that will provide premium release of aggressive adhesives therefrom.

The triorganosiloxane-endblocked polydiorganosiloxane fluid has the formula $R_3SiO(R_2SiO)_qSiR_3$ wherein the value of q is such that the viscosity of the polydiorganosiloxane has a value of at least 500 centipoise (0.5 pascal-seconds) at 25° C. Fluids wherein R is limited to methyl radicals and mercaptopropyl radicals have a value for q of at least approximately 150 to provide a viscosity of at least approximately 0.5 Pa•s. Each R radical may be, independently, an alkyl radical of from 1 to 6 carbon atoms, such as methyl, ethyl, isopropyl, butyl, pentyl, and hexyl; a phenyl radical or a mercaptoalkyl radical. Suitable mercaptoalkyl radicals have the formula $-(CH_2)_nSH$, wherein n has a value of from 1 to 4, such as $-CH_2SH$, $-CH_2CH_2SH$, $-CH_2CH_2CH_2SH$ and $-CH_2CH_2CH_2CH_2SH$. Mercaptopropyl radicals are preferred because of favorable synthesis, stability and odor characteristics.

From 50 to 99 percent, preferably from 95 to 99 percent, of all R radicals in the polydiorganosiloxane are the methyl radical. It is preferred that each silicon atom therein has at least one silicon-bonded methyl radical. Preferably the number of phenyl radicals is limited to from 0 to 5 percent of all R radicals, since the cure rate of radiation-cured compositions is retarded by the presence of phenyl radicals. From 1 to 5 percent of all R radicals are mercaptoalkyl radicals; however, there must be an average of at least 3 mercaptoalkyl radicals per molecule in the polydiorganosiloxane fluid in order to assure proper cure of the fluid. Mercaptoalkyl radicals may be bonded to any of the silicon atoms but it is preferred that a majority of mercaptoalkyl radicals are non-terminal, i.e. are bonded to non-terminal silicon atoms.

Triorganosiloxane-endblocked polydiorganosiloxanes that are preferred in the method of this invention have two methyldiorganosiloxane endblocking units per molecule, such as $(CH_3)_3SiO_{\frac{1}{2}}$, $(CH_3)_2(HSCH_2CH_2CH_2)SiO_{\frac{1}{2}}$ and $C_6H_5(CH_3)_2SiO_{\frac{1}{2}}$, and a plurality of methylorganosiloxane units such as $(CH_3)_2SiO$, $CH_3(C_6H_5)SiO$, $CH_3(CH_3CH_2)SiO$, $CH_3(HSCH_2CH_2)SiO$ and $CH_3(HSCH_2CH_2CH_2)SiO$ forming the polymer chain. A polydiorganosiloxane consisting of $(CH_3)_3SiO_{\frac{1}{2}}$ units, $(CH_3)_2SiO$ units and $CH_3(SHCH_2CH_2CH_2)SiO$ units is highly preferred for reasons noted above. While the polydiorganosiloxane is described as consisting of triorganosiloxane units and diorganosiloxane units, it is to be understood that there can be present therein trace amounts of $RSiO_{3/2}$ and $SiO_{4/2}$ units that are normally present as impurity units in commercial polydiorganosiloxanes.

The viscosity of the polydiorganosiloxane fluid should have a value of at least 0.5 pascal-seconds (Pa•s) at 25° C. so that the fluid can be conveniently applied to a substrate and cured. There is no known upper limit for the value of the viscosity; however, it should be sufficiently low so that the fluid, or a solution thereof, can be readily applied to the substrate. For general applications a practical upper limit for the viscosity of the polydiorganosiloxane fluid, or a solution thereof, is approximately 100 Pa•s. For paper coating applications, a preferred upper limit for said viscosity is approximately 10 Pa•s. If the viscosity of the polydiorganosiloxane fluid is undesirably high, water or any common volatile organic liquid, such as benzene, toluene, methylene chloride or cyclohexane can be admixed therewith to dissolve, disperse or suspend the fluid and thereby reduce its viscosity to a value of no more than 100 Pa•s at 25° C., preferably no more than 10 Pa•s at 25° C. for paper coating applications. Preferably the undiluted polydiorganosiloxane fluid has a viscosity of from 0.5 to 100 Pa•s at 25° C. for general applications and a viscosity of from 0.5 to 10 Pa•s at 25° C. for paper coating applications.

The polydiorganosiloxane fluid may be prepared by any suitable method that can be used for the preparation of triorganosiloxane-endblocked polydiorganosiloxane bearing mercaptoalkyl radicals. For example, in one method a silane bearing silicon-bonded hydrolyzable radicals and at least one mercaptoalkyl radical, such as $(HSCH_2CH_2CH_2)(CH_3)-Si(OCH_3)_2$ is hydrolyzed and condensed in the well-known manner to prepare a mixture of cyclic and silanol-endblocked polyorganomercaptoalkylsiloxanes. The resulting hydrolyzate is then mixed with an appropriate amount of a suitable diorganocyclopolysiloxane such as cyclopolydimethylsiloxane, an appropriate amount of a suitable endblocking source such as a triorganosiloxane-endblocked siloxane such as decamethyltetrasiloxane or hexamethyldisiloxane and an acid catalyst such as $CF_3SO_3H$ and heated for from 3 to 8 hours. Alternatively, a sulfur-free triorganosiloxane-endblocked polydiorganosiloxane containing suitably reactive groups such as silicon-bonded hydrogen, chloropropyl or olefin such as vinyl and allyl may be reacted with an appropriate sulfur-containing material such as allyl mercaptan, NaSH or $H_2S$, respectively. Other methods for preparing the mercaptoalkyl-containing polydiorganosiloxane will be obvious to one skilled in the silicone polymer art.

To increase the rate of cure of the radiation-curable polydiorganosiloxane composition under the action of ultraviolet light, and thus decrease the minimum cure time, it is desirable to admix therewith an effective amount of a photosensitizer. Any suitable photosensitizer may be used such as the well-known halogenated hydrocarbons such as hexachlorobutadiene; aromatic ketones such as acetophenone, benzophenone, dibenzosuberone and benzoin ethyl ether and azo compounds such as azobisisobutyronitrile. Any suitable photosensitizer may be admixed therewith at any time prior to the curing of said polydiorganosiloxane. These photosensitizers are effective for photosensitizing in concentrations as low as approximately 500 parts by weight for every one million parts by weight of the radiation-curable polydiorganosiloxane composition.

The radiation-curable polydiorganosiloxane composition may contain other ingredients such as odor control additives, shelf-life stabilizer, pigments and rheology control additives which will not interfere significantly with the radiation cure of the composition or the premium release of adhesives from the cured composition.

In the method of this invention the radiation-curable polydiorganosiloxane composition may be applied to and cured on any suitable solid substrate such as cellulosic materials such as paper and wood; metals such as aluminum, iron and steel; plastics such as polyethylene or polypropylene films or sheets, polyethylene or polypropylene films on other surfaces such as on paper, polyamides such as nylon and polyesters such as Mylar ®, (registered trademark of E. I. duPont de Nemours, Wilmington, Del.); and siliceous materials such as ceramics, glass and concrete.

The method of this invention is particularly useful for providing release coatings for cellulosic paper. The radiation-curable composition may be applied in a thin layer to the surface of said paper to provide a coating with a mass of approximately one gram per square meter of coated paper. In the cured form these thin coatings will release aggressive adhesives from the surface of the treated paper with a force of no more than approximately 38.61 newtons/meter as measured by the method hereinafter described. It is to be understood that said coatings may also be applied in thinner or thicker layers as long as the radiation cure of the coating is not impaired. In the paper release coating art the amount of release coating will generally vary from approximately 0.1 to 2.0 grams per square meter.

In the method of this invention the radiation-curable polydiorganosiloxane compositions are applied to a substrate by any suitable method such as brushing, dipping, spraying, rolling and spreading. Application of said compositions to paper may be done by any of the suitable methods that are well-known in the paper coatings art such as by a trailing blade coater, by an air knife, by kiss rolls, by gravure rolls, by printing or by any other known method. Said polydiorganosiloxane composition may be applied to the entire surface of a substrate or to any portion thereof, as desired. After the radiation-curable polydiorganosiloxane composition has been applied it is preferred to remove any solvents that may be present in the applied composition. Preferably said composition has a viscosity such that no solvent is required to aid in its preparation or application to the substrate.

The applied radiation-curable polydiorganosiloxane composition is thereafter exposed to energetic radiation for a length of time sufficient to cure the liquid composition and to adhere the cured composition to the substrate. In the curing process the liquid composition is converted to the solid state. For adhesive release purposes however, the cured state of the composition is further determined by the Scotch ® (registered trademark of 3M Company, Minneapolis, Minnesota) tape test, hereinafter described, and the cured compositions must adhere to the substrate with an adhesive force that is greater than the adhesive force between the cured composition and the adhesive to be released. It should be understood that the entire applied composition may be exposed to radiation and cured or only a portion thereof may be exposed and cured and any uncured composition subsequently removed, as desired.

Energetic radiation, for the purposes of this invention, is radiation selected from the group consisting of actinic radiation such as ultraviolet light, X-rays and gamma rays and particulate radiation such as alpha particles and electron beams. The length of time that the radiation-curable compositions should be exposed to the energetic radiation, in order to cure said composition and to adhere it to the substrate, will depend upon the energy of the radiation and the intensity of the radiation that is incident on the composition. Furthermore, the effectiveness of incident radiation is dependent upon several factors. For example, it is known that low energy electron beams are more effective in an inert atmosphere such as nitrogen, than in air. We have also found that the adhesion to paper and the minimum cure time for the radiation-curable compositions that are exposed to ultraviolet light are directly related to the oxygen content of the atmosphere between the composition to be cured and the ultraviolet light source. Of course, it is well known that the intensity of the incident radiation is also inversely proportional to the distance between the energy source and the composition.

When using ionizing radiation, such as an electron beam in a nitrogen atmosphere, we have found that a dose of from 1 to 5 megarads is sufficient to effect a cure of the radiation-curable polydiorganosiloxane composition.

Ultraviolet light is a preferred form of energetic radiation for curing the radiation-curable polydiorganosiloxane composition because of its relative safety, lower cost and lower power requirements. Furthermore, ultraviolet light that contains radiation having a wave length of from approximately 200 to 400 nanometers is highly preferred for the method of this invention because such radiation will cure the radiation-curable polydiorganosiloxane that has been coated on paper within 5 seconds, as detailed in the following examples.

The method of this invention uniquely provides for the preparation of articles comprising a substrate having adhered to at least a portion of its surface a cured polydiorganosiloxane coating that will release aggressive adhesive with a force of no more than approximately 38.61 newtons per meter.

The best way, known at this time, to practice this invention is detailed in the following examples which are provided to further exemplify the invention and are not to be construed as limiting the invention which is properly delineated by the appended claims. All parts are parts by weight and all viscosities are at 25° C. All release data were measured in grams per inch and converted to N/m for this application by multiplying by 0.3860886 and rounding off. All viscosities were measured in centipoise and were converted to pascal-seconds by multiplying by 0.001.

EXAMPLE 1

A three-necked resin kettle fitted with a mechanical stirrer, reflux condenser and addition funnel was charged with 43.5 parts of the hydrolyzate of $CH_3(HSCH_2CH_2CH_2)Si(OCH_3)_2$ and 4 parts of hexamethyldisiloxane. The stirred mixture was heated to 70–80° C., 0.25 parts of $CF_3SO_3H$ was added to the warm mixture and heating was continued at 70–80°0 C. for an additional 30 minutes. Over a period of one hour, 456.5 parts of cyclopolydimethylsiloxane was added to the resin kettle and the reaction temperature was maintained at 80–90° C. Water, 0.03 parts, was then added and the mixture was heated for 5.5 hours at about 80° C. The $CF_3SO_3H$ was neutralized with 2.5 parts of $Na_2CO_3$ and stirring was continued at 80° C. for an additional 1 hour. The mixture was filtered and stripped at 150° C. and less than 5 mm. of mercury pressure (667 pascal). The non-volatile fluid had a viscosity of 1.62 pascal-seconds and consisted of 0.78 mole percent $(CH_3)_3$-$SiO_{\frac{1}{2}}$ units, 94.26 mole percent $(CH_3)_2SiO$ units and 4.96 mole percent $CH_3(HSCH_2CH_2CH_2)SiO$ units. Thus, the silicon-bonded organic radicals of the non-volatile fluid consisted of 2.47 percent $HSCH_2CH_2CH_2$- radicals and 97.53 percent $CH_3$- radicals.

Ninety-seven parts of this polymer was mixed with 1.5 parts of benzophenone at 55° C. to provide a radiation-curable formulation.

The formulation was coated at a thickness of 0.04 mils onto 40 pound supercalendared kraft paper using a blade coater to give approximately 0.8 pounds of coating per 3000 square feet of paper surface (1.3 g/m$^2$). The coating was exposed at a distance of approximately 80 mm for 1.7 seconds to two 20 inch (0.51 m) Hanovia medium pressure lamps having an input of 200 watts/inch (7.8 kW/m), an output of 1.4 kW/m in the ultraviolet and a U.V. maximum at 366 nm. The coating was considered to be cured if a piece of Scotch ® tape would stick to itself after having first been adhered to the coating and then removed, and its adhesive-containing surface doubled back on itself. The coating passed this cure test. The adhesion of the cured formulation to the paper was determined by firmly rubbing the cured coating with the index finger. Adhesion is deemed to be a preferred level of adhesion if no rub-off occurred during said rubbing. This coating experienced some rub-off and therefore did not have a preferred level of adhesion. However, adhesion was satisfactory for the release of aggressive acrylic adhesives as noted below. The cured formulation was prepared for release testing according to the following procedure. After being aged overnight at room temperature the cured coating was coated with adhesive using a solution of Monsanto ® GMS-263 acrylic adhesive. The acrylic adhesive solution was applied to the cured coating at a wet thickness of 3 mils (76.2μm) using a draw-down bar. The applied adhesive was air-dried at room temperature for one minute, heated at 65° C. for one minute and then cooled to room temperature again for 1 minute. A sheet of 60 pound matte litho was applied to the dried adhesive and the resulting laminate was pressed through two rolls of an off-set printer and aged for 20 hours at 70° C.

Release testing of the laminate was accomplished by cooling the aged laminate to room temperature, cutting the cooled laminate into 1 inch (25.4 mm) strips and pulling the Matte/adhesive lamina from the Kraft paper/coating lamina at an angle of 180° ($\pi$ radians) at 400 inches/minute (0.17 m/s). The force that was required to separate the laminate was 25.10 N/m. A composition that results in a release value of no more than 38.61 N/m using this test is considered to display premium release.

EXAMPLE 2

The trimethylsiloxane-endblocked polydiorganosiloxane polymer of Example 1 was coated on kraft paper as in Example 1 except that the benzophenone was omitted. The coated paper was subjected to 2.0 megarads of low-energy electron beam radiation using an Energy Science CB-150 instrument in an atmosphere of nitrogen containing 0.1 weight percent oxygen. The coating was almost completely cured and displayed almost no rub-off as measured by the tests described above. This coating would be suitable for releasing aggressive styrene-butadiene rubber based adhesives that are not too sensitive to detackification.

That which is claimed is:

1. A method for treating a solid substrate to improve the release of adhesive materials therefrom, said method comprising
    (I) applying to the substrate a radiation-curable polydiorganosiloxane composition consisting essentially of a triorganosiloxane-endblocked polydiorganosiloxane fluid having a viscosity of at least 0.5 pascal-seconds at 25° C., wherein from 50 to 99 percent of all organic radicals are methyl radicals from 1 to 5 percent of all organic radicals are mercaptoalkyl radicals having the formula —$(CH_2)_n$SH, wherein n has a value of from 1 to 4 inclusive, there being an average of at least 3 mercaptoalkyl radicals per molecule, any remaining organic radicals being phenyl radicals or alkyl radicals having from 2 to 6, inclusive, carbon atoms,
    (II) exposing the applied composition to energetic radiation, thereby curing the applied composition, and
    (III) recovering an article comprising the substrate having adhered thereto a cured polydiorganosiloxane that will provide premium release of aggressive adhesives therefrom.

2. The method of claim 1 wherein the substrate is a cellulosic paper.

3. The method of claim 2 wherein a photosensitizing amount of a photosensitizer is used in the uncured polydiorganosiloxane composition.

4. The method of claim 3 wherein from 95 to 99 percent of the organic radicals in the triorganosiloxane-endblocked polydiorganosiloxane fluid are methyl radicals and any remaining organic radicals are mercaptoalkyl radicals.

5. The method of claim 4 wherein the triorganosiloxane-endblocked polydiorganosiloxane consists of $(CH_3)_3SiO_{\frac{1}{2}}$ units, $(CH_3)_2SiO$ units and $CH_3(HSCH_2CH_2CH_2)SiO$ units.

6. An article produced by the method of claim 1.

7. A cellulosic release paper produced by the method of claim 5.

UNITED STATES PATENT AND TRADEMARK OFFICE
CERTIFICATE OF CORRECTION

PATENT NO. : 4,133,939
DATED : January 9, 1979
INVENTOR(S) : Gary N. Bokerman, et al It is certified that error appears in the above—identified patent and that said Letters Patent are hereby corrected as shown below:

Column 3, line 52, "$(CH3)_2 SiO$" should read --$(CH_3)_2 SiO$--

Column 4, line 31, "Alternatively" should read --Alternately--

Column 6, line 51, "70-80°0 C" should read --70-80°C--

Signed and Sealed this

Twenty-fifth Day of September 1979

[SEAL]

Attest:

LUTRELLE F. PARKER
Attesting Officer   Acting Commissioner of Patents and Trademarks